Aug. 1, 1950     D. D. JOHNSTON     2,517,320
DOUBLE VESSEL FOR WARMING ARTICLES OF FOOD
Filed June 21, 1946     2 Sheets-Sheet 1
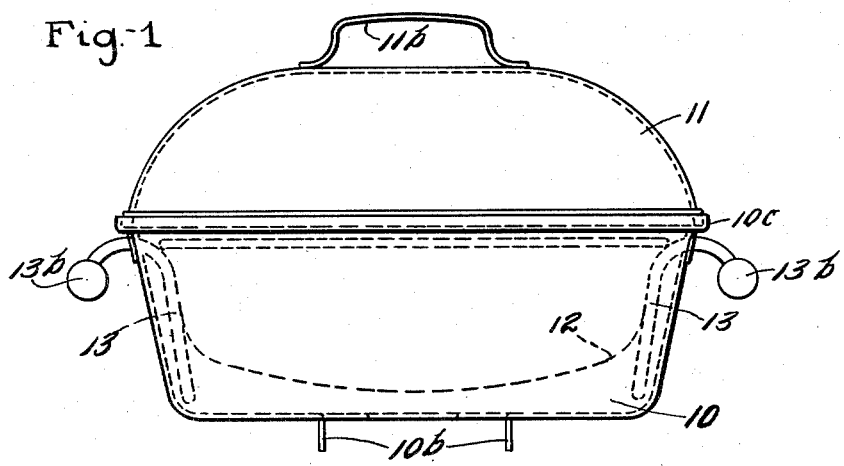
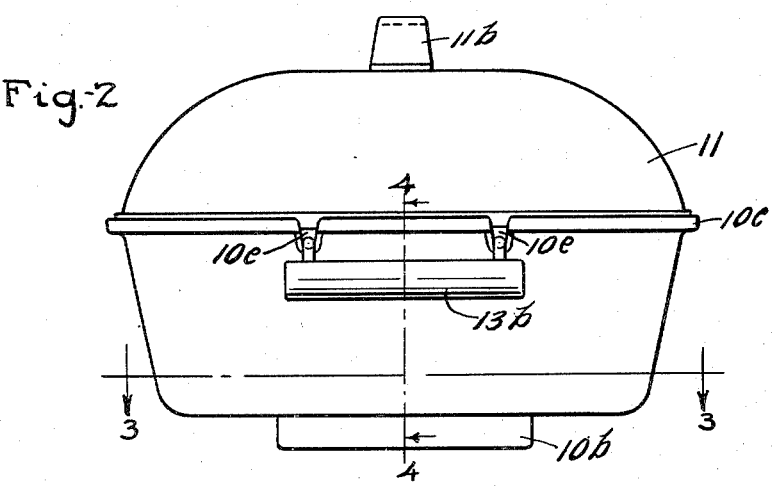
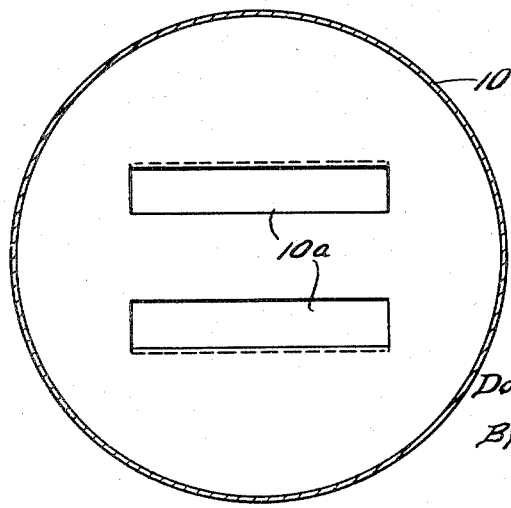
Inventor
DOROTHY D. JOHNSTON
By Chas. E. Rey
Attorney Aug. 1, 1950            D. D. JOHNSTON            2,517,320

DOUBLE VESSEL FOR WARMING ARTICLES OF FOOD

Filed June 21, 1946            2 Sheets-Sheet 2

Inventor
DOROTHY D. JOHNSTON
By Chas. C. Reif
Attorney

Patented Aug. 1, 1950

2,517,320

UNITED STATES PATENT OFFICE 2,517,320

DOUBLE VESSEL FOR WARMING ARTICLES OF FOOD

Dorothy D. Johnston, Minneapolis, Minn.

Application June 21, 1946, Serial No. 678,508

8 Claims. (Cl. 126—376)

This invention relates to a warming device and particularly to a warming device adapted to be supported upon a toaster having openings in its top. It is often desired to re-heat, re-crisp and refresh rolls, crackers and other bakery goods and various other articles such as French-fried potatoes, fish, croquettes, etc. It is very desirable to be able to do this at the dining table so that a person does not have to go to the kitchen stove or range.

It is an object of this invention to provide a simple, efficient and easily operated warming device which may be supported on a toaster and heated thereby.

It is a further object of the invention to provide a warming device comprising an outer vessel having generally imperforate walls, a movable lid for said vessel, a second vessel having reticulate walls disposed within said outer vessel, said outer vessel having one or more openings in its bottom and being arranged to rest upon the top of a toaster having one or more bread-receiving slots in its top with the openings in said vessel alined with the slots in said toaster whereby the heat from said toaster can pass through said openings into said outer vessel and about said second vessel.

It is also an object of the invention to provide such a device as set forth in the preceding paragraph, said outer vessel having means depending therefrom adapted to be disposed in the slots in said toaster to position said outer vessel on said toaster, said means preferably being plate-like portions extending along the sides of said openings in said outer vessel.

It is a further object of the invention to provide a warming device comprising an outer vessel having generally imperforate walls, a movable lid for said vessel, a second vessel disposed within said vessel and having reticulate walls, and handles secured to said second vessel and extending to the outer side of said outer vessel.

It is also an object of the invention to provide such a device as set forth in the preceding paragraph, said second vessel also having legs thereon whereby it can be supported upon a surface or a table.

It is more specifically an object of the invention to provide a warming device comprising an outer vessel having spaced slots in its bottom with depending portions along the sides of said slots, a removable lid for said vessel, said vessel having pairs of spaced slots therein at its top, a second vessel within said outer vessel having reticular walls, handles secured to said second vessel having spaced portions extending outwardly through said last mentioned slots respectively and resting therein to support said second vessel, said handles extending downwardly below said second vessel to form legs therefor.

These and other objects and advantages of the invention will be fully set forth in the following description made in connection with the accompanying drawings in which like reference characters refer to similar parts throughout the several views and in which:

Fig. 1 is a view in front elevation of said device;

Fig. 2 is a view in side elevation taken at right angles to Fig. 1;

Fig. 3 is a horizontal section taken on line 3—3 of Fig. 2, as indicated by the arrows;

Figure 4:
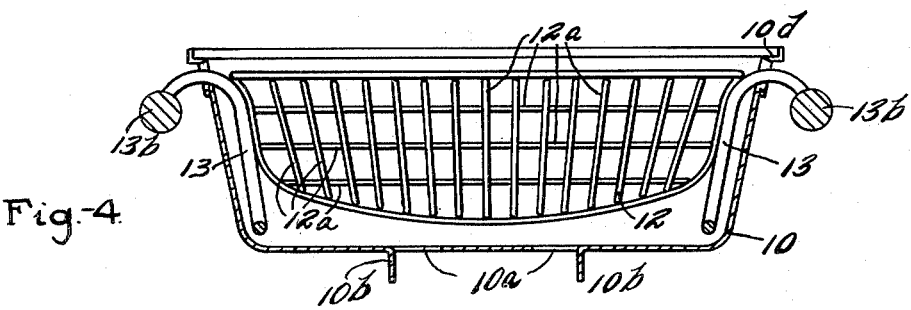
Fig. 4 is a central vertical section on line 4—4 of Fig. 2, as indicated by the arrows, with the lid or cover removed.
Figure 5:
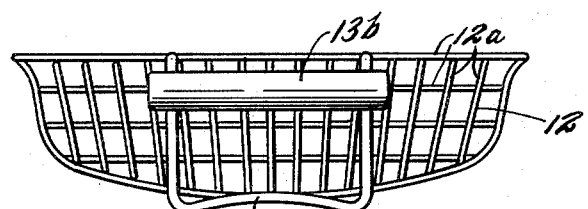
Fig. 5 is a view in side elevation of an inner vessel used.
Figure 6:
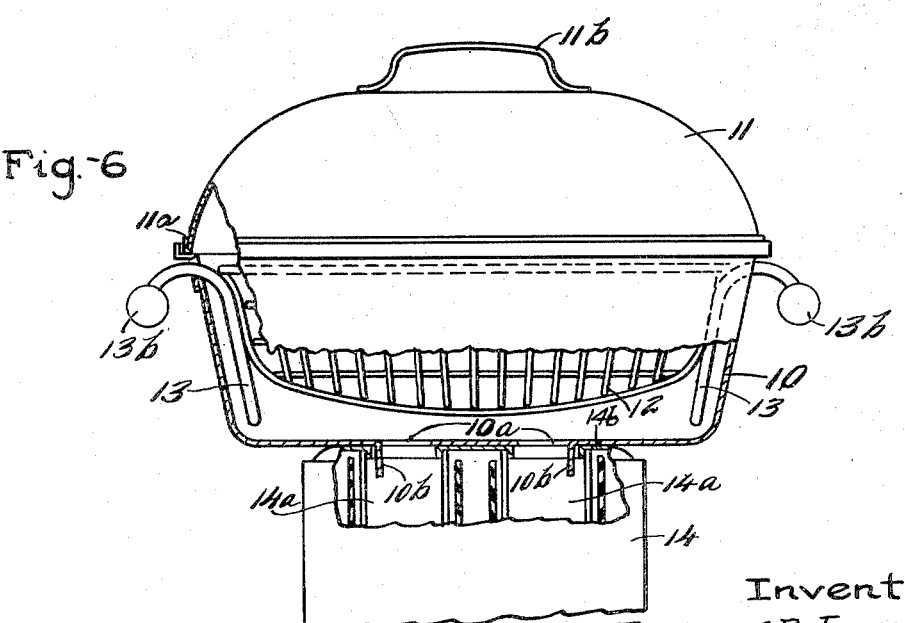
Fig. 6 is a view in front elevation of the device shown in position on a toaster, certain parts being broken away and others shown in vertical section.

Referring to the drawings, a device is shown comprising an outer vessel 10. While this vessel might be of various shapes, in the embodiment of the invention it is shown as of general bowl or pan shape and having a substantially flat bottom. Vessel 10 has imperforate or substantially imperforate walls. Spaced openings 10a are formed in the bottom of vessel 10, and while these might be variously formed, they are shown as spaced slots substantially rectangular in plan. Vessel 10 has means 10b depending therefrom adjacent openings 10a and these are illustrated as plate-like portions extending downwardly from the bottom of vessel 10 and may conveniently be formed by pressing the material from the slots 10a downwardly. Vessel 10 has an outwardly extending rim 10c at its top, the same being of angular form so as to provide an annular supporting surface 10d. A movable lid 11 is provided for vessel 10, and while this might be variously constructed, it is shown as a removable lid of general dome shape and having a reversely bent rim portion 11a fitting in the rim 10c and resting on surface 10d. Cover or lid 11 has a bail handle 11b secured thereto at its top. Vessel 10 also has pairs of spaced slots 10e formed therein and these are shown as disposed at opposite sides of said vessel. A second vessel 12 is provided adapted to be disposed within vessel 10 and being of smaller size than vessel 10. Vessel 12 has walls of reticulate or perforated form, and while these might be variously formed, in the embodiment of the invention illustrated they are shown as formed of spaced wires or small rods 12a crossing substantially at right angles and secured together in any suitable manner, as by soldering or welding. The top member 12a is of general circular form and constitutes a rim for vessel 12. Vessel 12 has secured thereto handles 13, and while these might be variously located, they are shown as disposed at opposite sides of vessel 12. Handles 13 could be variously made and are illustrated as formed of small rods having spaced portions extending along the sides of vessel 12 and secured thereto in any suitable manner, as by soldering or welding. Handles 13 extend upwardly and outwardly in curved form and respectively pass through the slots 10e. Handles 13 rest on the bottom of slots 10e and thus support vessel 12 which is supported with its bottom above the bottom of vessel 10. The spaced portions of handles 13 are connected at their bottoms by portions 13a which are curved upwardly somewhat. The portions 13a form legs which may rest on a surface of a table or other object and support vessel 12. The outer ends of the spaced portions of handles 13 are connected by the portions 13b shown as of cylindrical form. These handles may be formed of wood, plastic or other suitable and ornamental material.

In operation the device is adapted to rest upon the top of a toaster 14. Toaster 14 has bread-receiving slots 14a opening at its top. Such toasters are now used in large numbers and are electrically heated. They are generally nicely finished and can be placed on the dining table in the dining room. The bottom of vessel 10 rests upon the top of toaster 14 and the plate-like portions 10b depend into slots 14a, the same being in substantial contact with the remote sides of said slots and having a length very slightly less than the length of said slots so that vessel 10 is firmly positioned upon toaster 14. The current can be turned on to heat toaster 14 and the articles to be heated are placed in the vessel 12 with lid 11 removed. Lid 11 is put in position and the heat from the toaster heating elements will now pass through openings 10a into vessel 10 and about vessel 12. The articles to be re-heated will thus be nicely warmed or heated without any danger of being burned. Toasters are usually provided with an adjustment for the current or heat and this can be used to regulate the heat supplied to the warming device. It has been found that the heat from the toaster is ample to give the desired re-heating of the articles. The handles 13, particularly portions 13b, being outside of vessel 10, are not appreciably heated. As stated, the device can be placed right on the dining table and when it is desired to serve the heated articles, lid 11 can be removed, vessel 12 lifted out of vessel 10 by handles 13 and vessel 12 can be passed to the various diners who can help themselves to the contents or the reheated articles. If desired, of course, the hostess can remove lid 11 and serve the articles from one position.

From the above description it will be seen that I have provided a simple, compact and very efficient warming device. As stated, the device has a high degree of utility in heating rolls, crackers and other bakery goods, and such things as French-fried potatoes, fritters, fish, croquettes and many other articles of food. The device will have a very pleasing appearance and will be nicely coated with chromium or other suitable plating. The device is very convenient and as stated can be used at the dining table. It is apparent that the device will have a high degree of utility for the purpose intended.

It will of course be understood that various changes may be made in the form, details, arrangement and proportions of the parts, without departing from the scope of applicant's invention, which generally stated, consists in the parts and combinations of parts disclosed and defined in the appended claims.

I claim:

1. A warming device having in combination, an outer vessel with generally imperforate walls, a movable lid for said vessel, said vessel having spaced parallel rectilinear slots in its bottom with substantially rectilinear plate-like portions depending along the sides of said slots respectively, and a second vessel within said outer vessel having perforate walls, said outer vessel being adapted to rest on the top of a toaster having bread-receiving slots in its top, said plate-like portions being constructed and arranged to depend into said slots in said toaster, whereby the ends of said portions may engage the ends of said slots and the remote sides of said portions may engage the remote sides of said slots to hold said outer vessel in position, whereby radiant heat from said toaster and heated air from said last mentioned slots can pass through said slots in said outer vessel and about articles in said second vessel.

2. The structure set forth in claim 1, said plate-like portions being disposed along the outer sides of said slots in said outer vessel.

3. The structure set forth in claim 1, said outer vessel having slots in opposite sides thereof at its top, said second vessel having members secured thereto extending through said slots respectively to locate and hold said second vessel in position in said outer vessel, said members projecting below the bottom of said second vessel to form legs depending therefrom, whereby it can be removed from said outer vessel and passed about by holding said handles and can be supported on a table by said legs.

4. A warming device having in combination, an outer vessel with imperforate walls, a movable lid adapted to cover and having a portion resting on said vessel, said vessel having spaced openings in the bottom and having separate spaced parallel rectilinear means depending from said outer vessel adjacent said openings respectively, said outer vessel being adapted to rest on top of a toaster having parallel rectilinear bread-receiving slots in its top, with said means depending into said slots, whereby radiant heat from said toaster and heated air from said slots can pass through said openings and through said second vessel.

5. A warming device having in combination, an outer vessel with imperforate walls and having pairs of spaced slots at its top and at opposite sides thereof respectively, a movable lid for said vessel, a second vessel with reticulate walls disposed within said outer vessel, members secured to said second vessel forming handles and extending through said slots respectively to without said outer vessel, said members extending below the bottom of said second vessel within said outer vessel to form legs whereby said second vessel can be removed from said outer vessel and supported on a surface by said legs, said outer vessel having spaced slots in the bottom thereof whereby it can be placed on a heating means and heat can pass through said slots and into said second vessel whereby the portions of said handles of said outer vessel will not be unduly heated.

6. A warming device having in combination, a vessel with generally imperforate walls, a removable lid for said vessel, said vessel having parallel rectilinear spaced slots in its bottom with spaced rectilinear plate-like portions depending along the sides of said slots respectively, said vessel being adapted to rest upon the top of a toaster having bread-receiving slots in its top, said plate-like portions being constructed and arranged to depend into said slots in said toaster whereby the ends of said portion may engage the ends of said bread-receiving slots and the remote sides of said portions may engage the remote sides of said last mentioned slots to hold said vessel in position.

7. A warming device adapted to be used with a toaster having bread-receiving slots in its top having in combination, a vessel with generally imperforate walls, a removable lid for said vessel, said vessel having spaced openings in its bottom and having spaced portions depending from its bottom along said openings at the remote sides thereof and adapted to be received in said slots, said vessel being adapted to rest on top of said toaster and said portions being constructed and arranged to depend into said slots whereby the ends of said portions may engage the ends of said bread-receiving slots and the remote sides of said portions may engage the remote sides of said bread-receiving slots and hold said vessel in position on said toaster.

8. The structure set forth in claim 1, handles secured respectively to the sides of said second vessel and extending without said outer vessel, said outer vessel having slots in the sides thereof, said handles having spaced portions respectively disposed in said slots beneath said lid.

DOROTHY D. JOHNSTON.

REFERENCES CITED

The following references are of record in the file of this patent:

UNITED STATES PATENTS

| Number | Name | Date |
|---|---|---|
| 1,023,645 | Hamilton | Apr. 16, 1912 |
| 1,395,345 | Jutton | Nov. 1, 1921 |
| 1,456,238 | Ivancic | May 22, 1923 |
| 1,698,225 | Dick | Jan. 8, 1929 |
| 1,710,971 | Dick | Apr. 30, 1929 |
| 2,001,615 | Karten | May 14, 1935 |
| 2,170,904 | Kircher | Aug. 29, 1939 |
| 2,218,974 | Platt | Oct. 22, 1940 |
| 2,221,098 | Langsam | Nov. 12, 1940 |

FOREIGN PATENTS

| Number | Country | Date |
|---|---|---|
| 658,103 | France | Jan. 22, 1929 |